US005568850A

United States Patent [19]
Neber

[11] Patent Number: 5,568,850
[45] Date of Patent: Oct. 29, 1996

[54] CONVEYING APPARATUS FOR ELONGATED OBJECTS

[75] Inventor: Fritz Neber, Schwaebisch Hall, Germany

[73] Assignee: Groninger & Co GmbH, Crailsheim, Germany

[21] Appl. No.: 388,748

[22] Filed: Feb. 15, 1995

[30] Foreign Application Priority Data

Sep. 3, 1994 [DE] Germany .............................. 9414323 U

[51] Int. Cl.$^6$ .................................................. B65G 1/00
[52] U.S. Cl. ........................................ 198/347.1; 198/389
[58] Field of Search ............................ 198/347.1, 466.1, 198/533, 389, 369.1, 436, 448

[56] References Cited

U.S. PATENT DOCUMENTS

| 2,744,066 | 5/1956 | Spiess, Jr. et al. | 198/533 X |
| 3,318,439 | 5/1967 | Sullivan | 198/347.1 |

FOREIGN PATENT DOCUMENTS

| 2542289 | 9/1984 | France | 198/347.1 |

Primary Examiner—James R. Bidwell
Attorney, Agent, or Firm—Michael J. Striker

[57] ABSTRACT

The conveying apparatus for transporting elongated objects having a radially protruding flange, particularly injectors, injecting containers and the like, includes two conveying tracks (18, 19) over which the objects move in a conveying direction and in a suspended position with the flanges (13) contacting bearing surfaces of the tracks; two vertical buffer storage devices (21, 22) consisting of a vibrating conveyor having one or more substantially spiral guideway (51, 52, 56) for conveying objects vertically downward; and/or an adjustable connecting guide device (20). A connecting guide device (20) is positioned between opposing ends of the conveying tracks (18, 19) and conveys the objects around a curved path between the two conveying tracks (18, 19). The adjustable connecting guide device (20) is adjustable to convey different sized elongated objects (11, 11a, 11b) between the two conveying tracks (18, 19) and the conveying tracks are designed to carry the different sized objects (11, 11a, 11b).

49 Claims, 7 Drawing Sheets

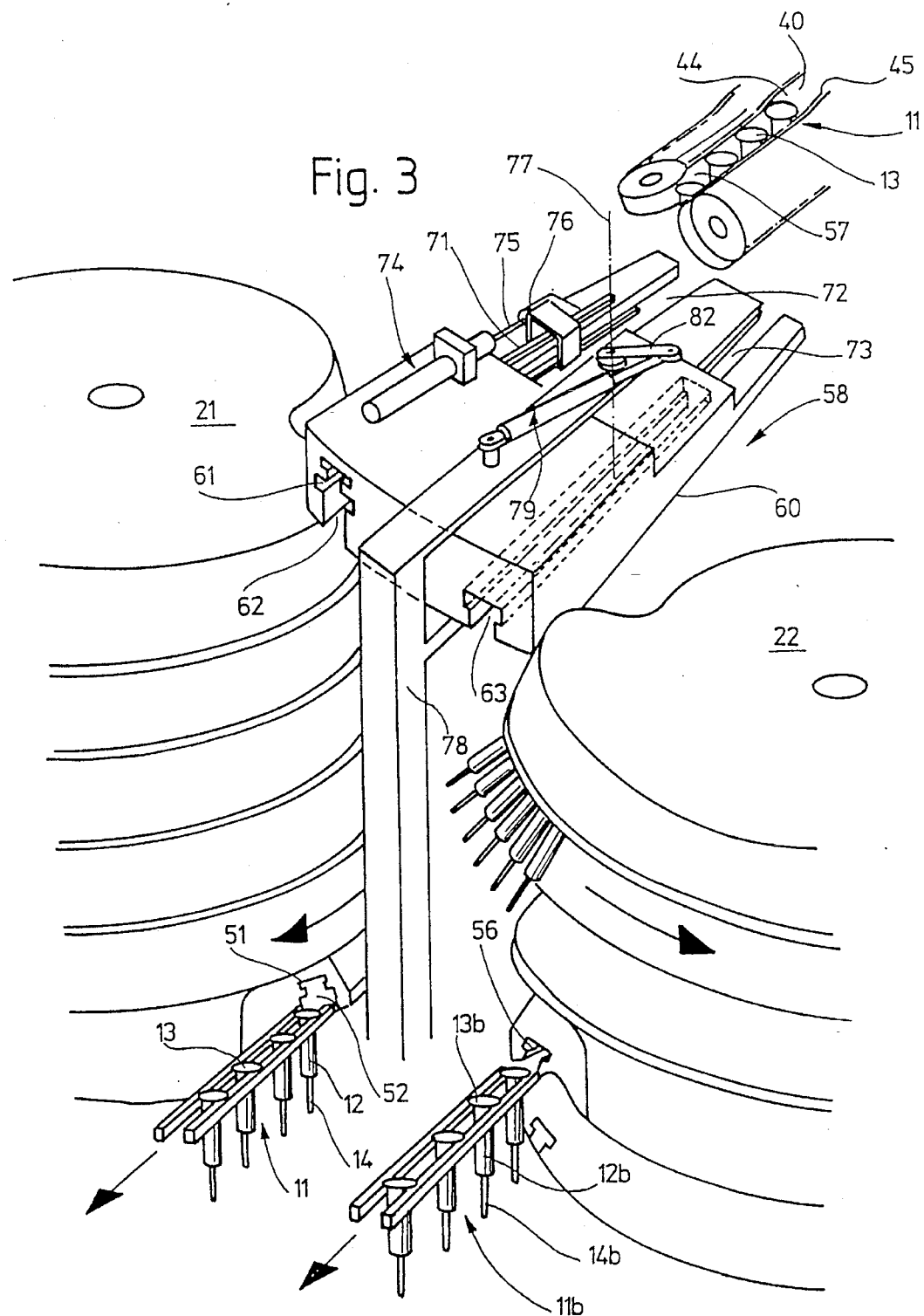

CONVEYING APPARATUS FOR ELONGATED OBJECTS

BACKGROUND OF THE INVENTION

The present invention relates to a conveying apparatus for elongated objects, such an injectors, injecting containers and the like spraying devices.

In a known conveying apparatus for objects of the above-described type, the objects are moved downstream in a conveying direction in a suspended position and contact surfaces of the conveying apparatus with a radially projecting and protruding flange.

Elongated objects, particularly injectors, injecting containers and the like containers, which are conveyed by a conveying apparatus of this type, vary with respect to each other in regard to their dimensions, particularly in regard to their diameters. The individual conveying apparatus is designed to handle elongated objects to be transported of a predetermined diameter in a known way. Currently if a change must be made to convey elongated objects of a different dimension, a comparatively costly adjustment must be made, in which various parts of the conveying apparatus are replaced by new components.

SUMMARY OF THE INVENTION

It is an object of the present invention to provide a conveying apparatus of the above-described type having a structure which makes a simple and economical change to a different format possible.

According to the invention, the conveying apparatus for transporting elongated objects, each having a radially protruding flange, comprises means for conveying the objects in a conveying direction including two conveying tracks over which the objects are movable in a suspended position on bearing surfaces of the conveying tracks with the flanges contacting the bearing surfaces; at least one vertical buffer storage device comprising a vibrating conveyor having at least one substantially spiral guideway for compactly conveying the objects substantially vertically downward; and/or at least one adjustable connecting guide device arranged between opposing ends of the two conveying tracks and including means for conveying the objects around a curved path between the two conveying tracks.

When the conveying apparatus has this type of adjustable connecting guide device, which can be reset to handle different sized elongated objects, particularly in the vicinity of the junction between two conveying tracks, a simple change in format is possible because of the adjustable connecting guide device. If the conveying apparatus has in addition to the connecting guide device, or instead of it, at least one of the above-described buffer storage devices, the elongated objects can be fed downwardly in a particularly space-saving manner so that the storage capacity of the buffer storage is greatly enhanced.

It is also particularly advantageous when the conveying apparatus has a connecting guide device which provides for a simple and economical transfer or transport of objects by a simple displacement and/or pivoting motion. The preferred connecting guide device between the conveying tracks has at least one guide support provided with a plurality of guide tracks and means for selecting one of the guide tracks for conveying the objects between the two conveying tracks. Each of the guide tracks is dimensioned, particularly has a different width, to convey different sized objects. The means for selecting one of the guide tracks includes means for displacing, preferably rotating, the at least one guide support between indexable active positions, each of the active positions connecting the two conveying tracks with a selected guide tracks according to the active position selected by the means for rotating. The means for rotating can be a positioning mechanism including a stepping motor. Alternatively, it can include a handle for manually selecting each active position and a locking device for locking the guide support in that active position. Advantageously in a preferred embodiment the means for conveying the guide support conveys the objects around a 90° angle on the curved path on the four guide tracks and the four guide tracks for different sized objects are interchanged in the preferred embodiment by 90° rotations of the guide support. However in other embodiments the guide support can be rotated between active positions by 360° /n degree angle rotations.

The invention also provide buffer storage devices and routing devices for them which are simple and economical and provide a compact way for transporting the objects of different size downward. The preferred conveying apparatus has a first buffer storage device provided with a first spiral guideway and an associated second spiral guideway located below the first spiral guideway and the first and the second spiral guideways have means for conveying the objects downward vertically and have different transverse cross-sections for conveying different sized objects. Particularly the first spiral guideway consists of a first T-shaped spiral groove and the second spiral guideway consists of a second T-shaped spiral groove. The stem of the first T-shaped spiral groove is connected to the arm of the second T-shaped spiral groove. The transverse cross-section of the first spiral guideway is smaller than the transverse cross-section of the second spiral guideway so that the objects conveyed by the second spiral guideway are larger than the objects conveyed by the first spiral guideway. A second buffer storage device is advantageously spaced from the first and has a third spiral guideway dimensioned so that objects conveyed by it are larger than those conveyed in the second spiral guideway of the first buffer storage device.

The preferred conveying apparatus also advantageously includes a switchable first routing device located upstream of the first buffer storage device and the second buffer storage device which includes means for feeding the objects to the storage devices and a switchable second routing device located downstream of the first buffer storage device and the second buffer storage device and including means for receiving the objects from the storage devices. The switchable routing devices comprise a guide member for objects of at least three different sizes received from the second spiral guideway of the first buffer storage device and from the third spiral guideway of the second buffer storage device.

A format change of the preferred conveying device is made in both a simple and economical manner when each of the conveying tracks includes two longitudinally extending conveyor elements on each side thereof and has a longitudinally extending track slot between the conveyor elements to receive and to convey the objects. In a particularly preferred embodiment of the conveying track each conveying track has two longitudinally extending conveyor flat surfaced elements at least adjacent sections of said conveyor elements bordering the track slot which are inclined relative to each other to form a wedge-shaped track slot so that the objects are suspended on the conveying track by gravity in the track slot. This latter conveying track has a wedge shape for compensating tolerances of the objects and for providing increased static friction.

BRIEF DESCRIPTION OF THE DRAWING

The objects, features and advantages of the present invention will now be illustrated in more detail by the following detailed description, reference being made to the accompanying drawing in which:

FIG. 3 is a schematic perspective view of two buffer storage devices each formed as a vibrating conveyor with projecting object routing devices;

DESCRIPTION OF THE PREFERRED EMBODIMENTS

Figure 1:
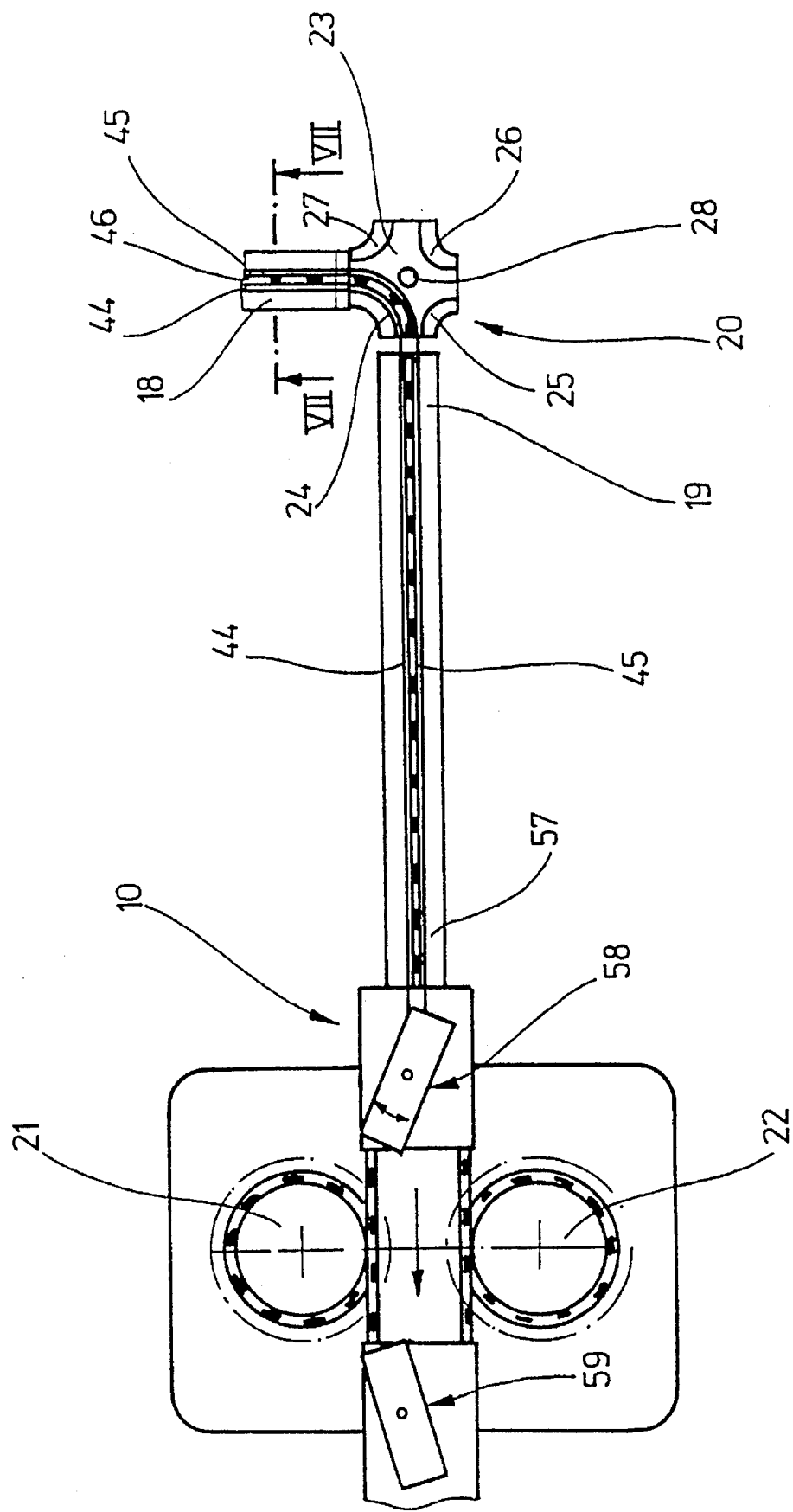
FIG. 1 is a schematic top view of a portion of a conveying apparatus for elongated objects.

A conveying apparatus 10, which is designed for elongated objects 11, particularly for injectors, injecting containers and the like, is shown in the drawing. The elongated objects 11 should be transported in a mostly approximately vertical position and advantageously suspended. Also since the objects 11 can be any type of object in principle, they can advantageously comprise prefilled injecting containers. The injecting container 12 shown in the drawing has a radially projecting and overhanging flange 13 at its upper end. The visible needle located at the lower end of the injecting container 12 is protected by a protective sleeve 14. When the objects 11 are conveyed by the conveying apparatus 10 the flange 13 contacts on associated surfaces of the conveying apparatus 10.

Figure 2:
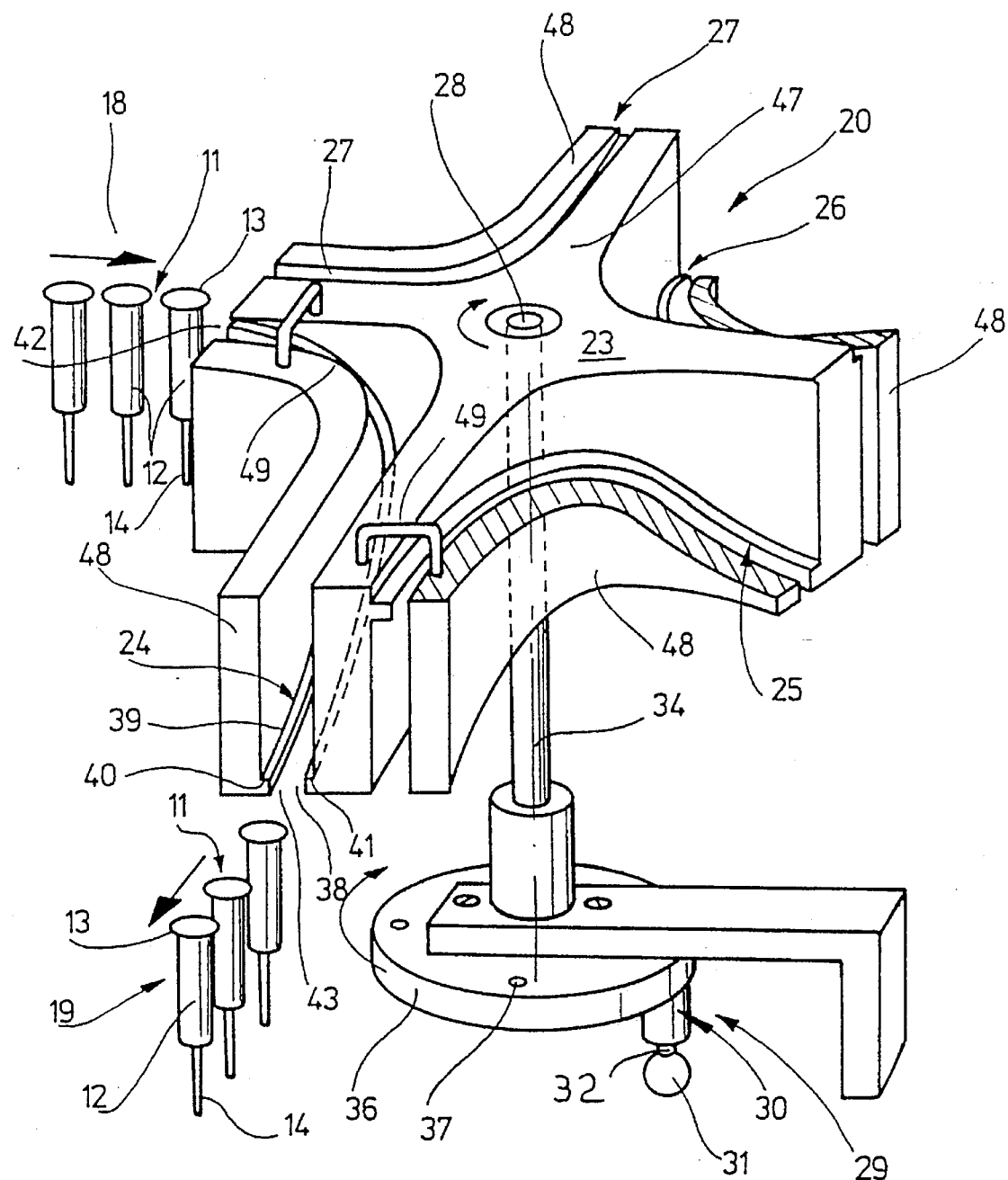
FIG. 2 is a partially cutaway perspective view of a connecting guide device of the conveying apparatus of FIG. 1.

The conveying apparatus 10 has at least one connecting guide device 20 which is shown in detail in FIG. 2. The connecting guide device 20 is placed between two conveying tracks 18 and 19 and connects these tracks around a curved path. The connecting guide device 20 is adjustable to different sizes, particularly different diameters which the objects 11 have, e.g. by a displacement motion, in as much as several different guide tracks follow each other in the displacement direction, e.g. in a vertical direction.

The conveying apparatus 10 includes at least one vertical buffer storage device 21, 22 comprising a vibrating conveyor having at least one approximately spiral guide track for conveying the objects from above to below, as shown in FIG. 1 and FIGS. 3 to 6. In the embodiment shown in the drawing a first buffer storage device 21 and a second neighboring buffer storage device 22 spaced from the first buffer storage device 21 are provided, both being formed as spiral conveyors. Detailed features are described in more detail later in connection with FIGS. 3 to 6.

Figure 2A:
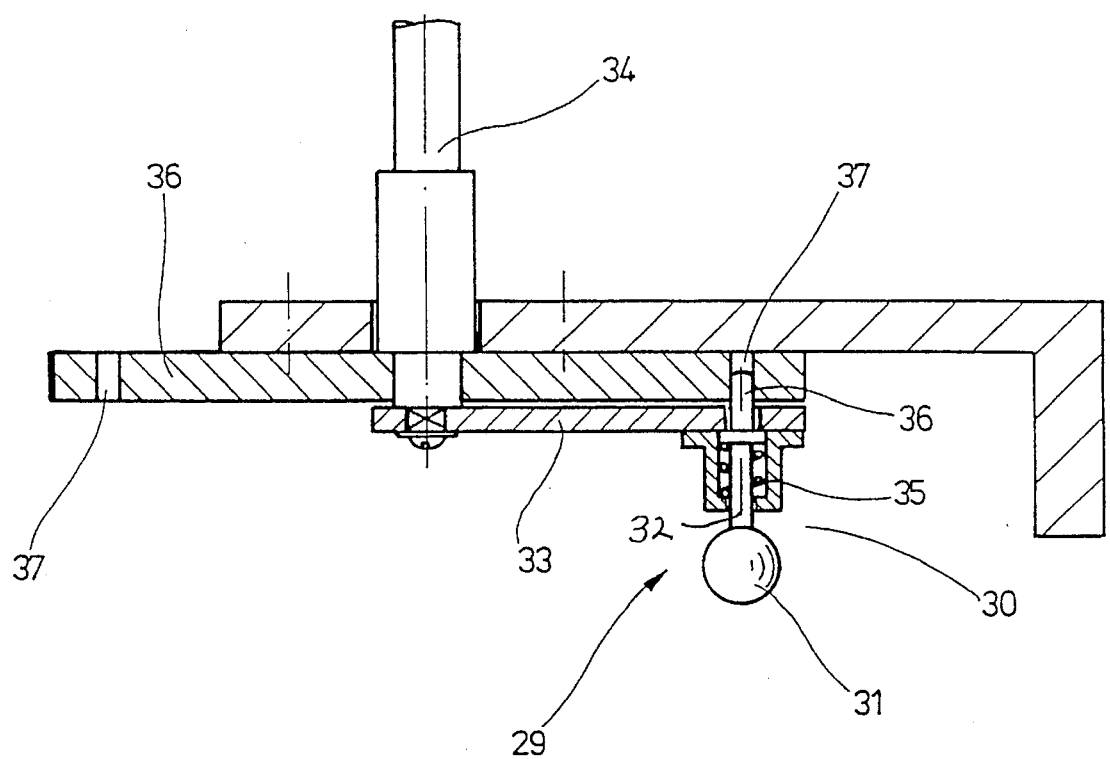
FIG. 2a is schematic cross-sectional view of an adjusting mechanism of the device shown in FIG. 2.

The connecting guide device 20 comprises at least one guide support 23, which is provided with a plurality of curved guide tracks 24 to 27 which are advantageously different sizes, particularly different widths for the objects 11. This connecting guide device 20 is adjustable by a displacement and/or pivoting motion so that one of the curved guide tracks 24 to 27 can be selected for connecting the conveying tracks 18 and 19. In the embodiment shown in the drawing the guide support 23 is advantageously pivotable about a substantially vertical axis 28 to one of several different pivot positions. Each of the pivot positions is associated with one of the four guide tracks 24 to 27. When the guide support 23 is pivoted into a selected pivot position the associated guide track is shifted into an active position connecting both conveying tracks 18 and 19. The guide support 23 is indexable in each pivot position. The connecting guide device 20 has a positioning mechanism 29 acting on the guide support 23. In an unshown example the positioning mechanism 29 has a positioning motor, e.g. a stepping motor, a pressurized medium-operated working cylinder or the like. In the embodiment shown in the drawing, particularly in detail in FIG. 2a, the positioning mechanism 29 has a handle 30 for manually pivoting and a locking device for locking it in a selected position. The handle 30 comprises a gripping knob 31, which has a protruding bolt 32 extending through one end portion of a securing lever 33 and acts by means of the securing lever 33 on a positioning device shaft 34, which is rigidly attached to the guide support 23. The gripping knob 31 is drawable against the action of a spring 35 so that its bolt 32 is drawn from a locking or indexing hole 37 of an indexing disk 36 so that it is possible to rotate the positioning device shaft 34 by the handle 30, e.g. into the next pivot position 90° from it, in which the bolt 32 can again engage in another indexing hole 37 and lock the connecting guide device 20 in position. It is understood that the handle 30 can be formed, among other things, as is conventional in this type of adjusting mechanism.

The guide support 23 has four guide tracks 24 to 27 in the embodiment shown in the drawing, each of which conveys the objects 11 over a curved path around a 90° turn, i.e. each spans a 90° curved path. The guide support 23 is pivotable over a pivot angle of 90°, but also greater or less than that. The position for the fourth guide track 27 shown in the drawing could in other embodiments be empty, i.e. in other embodiments the fourth guide track can be omitted if it is not needed.

Furthermore in other unshown embodiments the guide support can have n-guide tracks which extend over an $360°/n_1$ arc. The guide support 23 is then made pivotable about a $360°/n_1$ arc from one pivot position associated with one guide track into another pivot position associated with another guide track. The guide support 23 can for example have five, six or eight or more guide tracks, which e.g. must be pivoted over a 360°/5 arc, a 360°/6 arc and a 360°/8 arc.

In the embodiment shown in the drawing the guide support 23 has an approximately star-like shape. Each guide track 24 to 27 of the guide support 23 is formed as a suspension means for the flange 13 of the object. Particularly each guide track 24 to 27 has a longitudinal slot, which is designated with the reference number 38. Each of the objects 11 extends through the longitudinal slot 38. In an analogous way the other guide tracks 25 and 27 have a similar longitudinal slot. The suspension means, e.g. the guide track 24, is formed so that a wider longitudinal slot 39 is located above the longitudinal slot 38 through which the objects 11 extend. The flanges 40, 41 of the guide support are formed on each side of the wider longitudinal slot 39 at its lower side. In FIG. 2 the track entrance 42 and the track outlet 43 of the guide track 24 is shown. The guide track 24 runs steeply down from the track entrance 42 to the track outlet 43. The remaining guide tracks 25 to 27 also extend over a similar steep course from their entrance to their track outlet. Because of that the guide tracks 24 to 27 each provide an inclined path from above to below, which makes the forward or downstream conveying of the objects 11 over the guide tracks easy.

The different guide tracks 24 to 27 of the guide support 23 have different slot widths and furthermore also different widths in the vicinity of the suspension device. Thus the guide track 24 is provided for a first type of objects 11, whose flange 13 has a predetermined diameter so that the flange can pass through the wider upper longitudinal slot 39 while the injecting container 12 has a diameter that fits through the longitudinal slot 38. The next guide track 25 in the pivot direction is dimensioned in regard to its width so that a second type of object 11 can fit through it, e.g. one having a smaller or larger diameter than the objects of the first type. This second type of object is indicated with 11a in FIG. 4.

The guide track 26 next following in the rotation direction of the guide support 23 is again different from the guide tracks 24, 25 in regard to the cross-section of the slots and it formed so that a third type of object 11b can fit in it, e.g. so that the injecting containers 12b which includes its flanges 13b are either greater or also smaller than the first and second types of objects.

The connecting guide device 20 makes a rapid and simple adjustment to different diameter objects 11 by pivoting to each of the pivot positions so that a rapid and simple change of the conveying apparatus 10 to objects 11 having substantially different diameters is possible. The conveying tracks 18, 19 which adjoin the connecting guide device 20 and the remaining regions of the conveying tracks can be rapidly and simply adjusted to different size objects 11 because both conveyor elements 44, 45, which form the track slot 46 between them, are adjustably spaced from each other. Then when necessary the distance between the conveyor elements 44, 45 can be changed.

The guide support 23 of the connecting guide device 20 is made of a suitable plastic material. It can be formed as two parts, e.g. from a star-like central support piece 47 and from four individual complementary pieces 48 which complete the central support piece 47 while also the guide tracks 24 to 27 are completed and which are attached to the central support piece 47 in a suitable way, e.g. by upper bridging elements 49.

Individual features of the first buffer storage device 21 and the second neighboring buffer storage device 22 are described more fully in the following with the help of FIGS. 3 to 6.

Figures 5, 6:
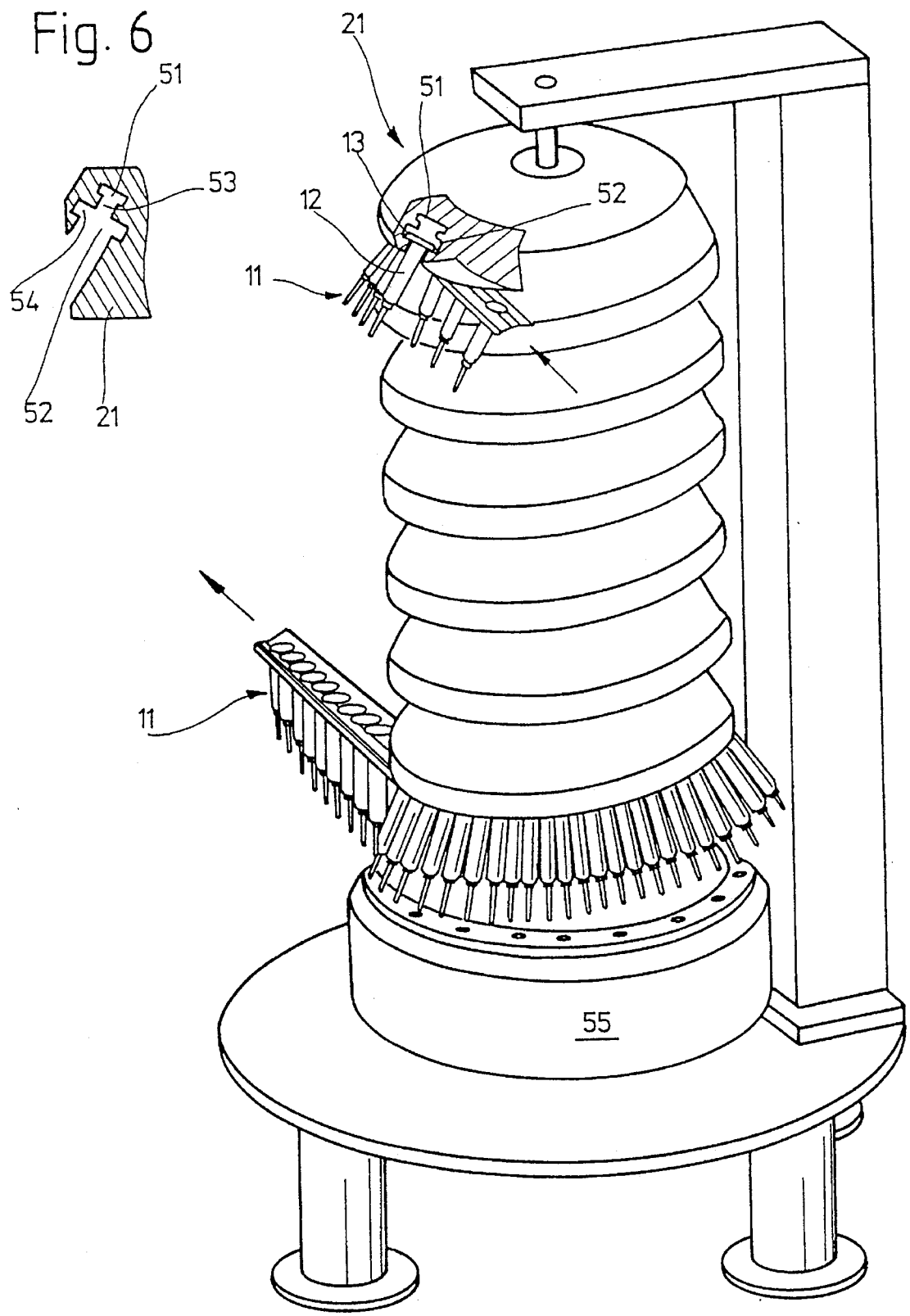
FIG. 5 is a schematic detailed partially cutaway perspective view of a first buffer storage device formed as a vibrating conveyor.
FIG. 6 is a schematic detailed cutaway cross-sectional view through an individual section of the first buffer storage device in FIG. 5.
Figure 7:
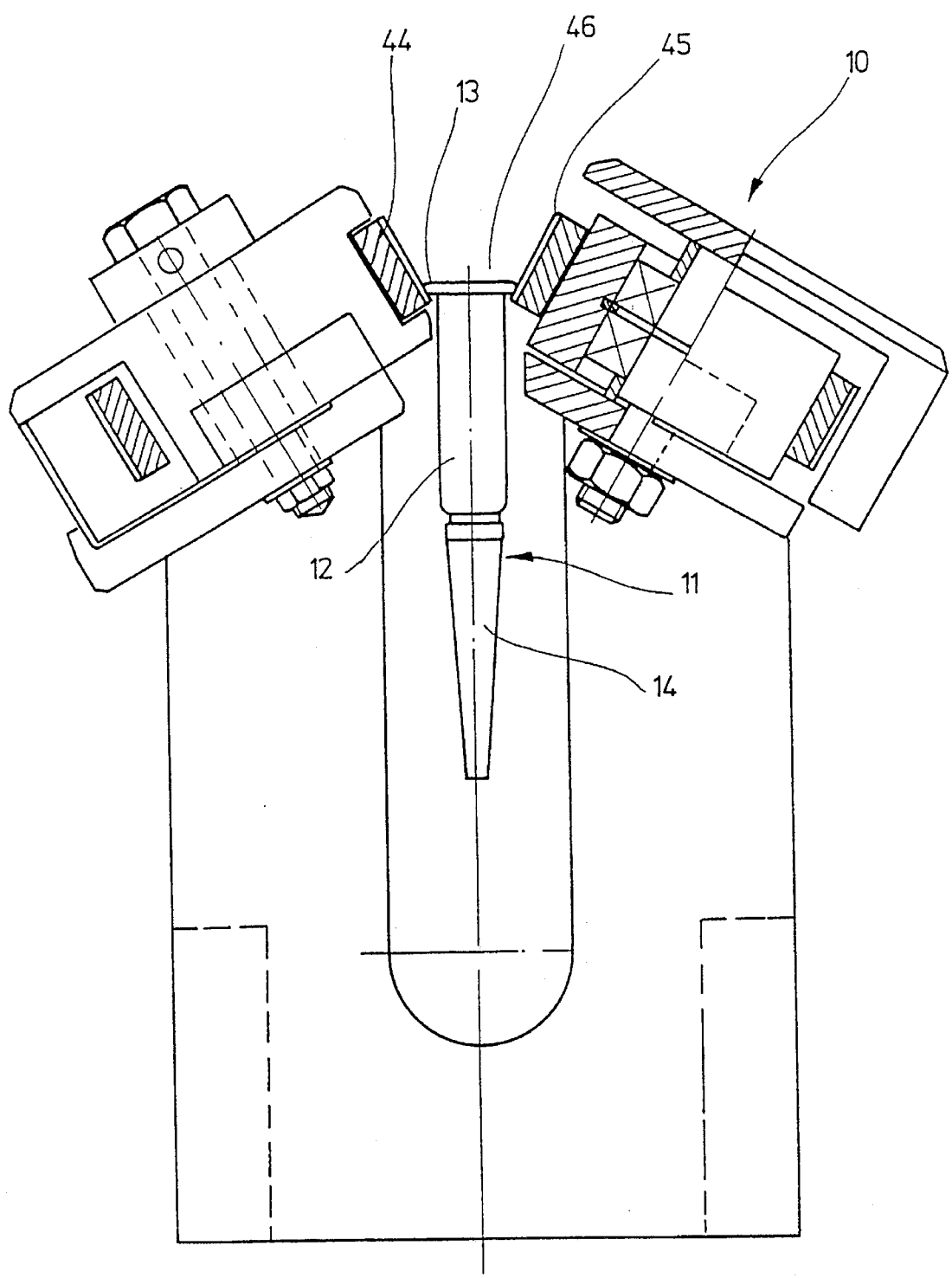
FIG. 7 is a schematic cross-sectional view taken along the section line VII—VII in FIG. 1 showing the individual elements of a conveying track.

The first buffer storage device 21 has a first guideway 51 and, e.g. under it a second guideway 52 which has a different cross-section from the first guideway 51. These guideways 51 and 52 are both spiral-shaped and guide the objects 11 from above to below in their respective storage devices. Instead of this arrangement, the first buffer storage device 21 can also have only a single guideway. At least one of the guideways 51, 52 of the first buffer storage device 21 is formed as an approximately T-shaped groove of different sizes. The upper groove or first guideway 51 is connected to the second guideway 52 via the slot 53 forming the stem 53 of the T, particularly with the slot 54 of this second guideway which forms the arm of the T. Apparently the first guideway 51 is dimensioned smaller in cross-section than the second guideway 52, and of course so that smaller objects 11a can be conveyed in the groove forming the first upper guideway 51 and larger objects 11 can be conveyed in the second lower groove forming the second guideway 52. Each of the approximately T-shaped guideways 51, 52 is formed so that the respective flanges 13a and/or 13 fit in the arm or principal cross-section of the T and the part connected to the flange, e.g. the injecting container 12a and/or 12, fits in the stem of the T. As FIGS. 5 and 6 show, the guideways 51, 52 are arranged so that the objects 11a and/or 11 are not vertical but are at an acute angle to the vertical and are guided so that this acute angle is approximately 45° or less.

The first buffer storage device 21 having the guideways 51 and 52 of the different cross-sections thus allows the storage of objects 11a and/or 11 of different cross-section and their transport by the vibrating conveyor drive 55. Since the individual guideways 51, 52 run downward and are spiral shaped, already these downwardly inclined paths facilitate the transport of the objects 11a and/or 11 from above to below and from the entrance to the outlet of the first buffer storage device 21. This conveying is assisted by the vibrating conveyor drive 55.

The second vertical buffer storage device 22 (FIGS. 1, 3) is arranged spaced from the first buffer storage device 21 and is similar to the first buffer storage device 21, with the exception of the guide tracks. Then the second buffer storage device 22 is provided with at least one spiral-shaped guideway 56 leading from above to below in this embodiment, which has a different cross-section than the guideways 51, 52 of the first buffer storage device 21. The spiral-shaped guideway 56 of the second vertical buffer storage device 22 has a cross-section so that different larger cross-sectioned objects 11b are conveyable in it, e.g. injecting containers 12b, whose flanges 13b and cylindrical container diameters are still larger than those of the objects 11.

In the embodiment shown in FIGS. 1 and 3 the objects 11 are fed from a first conveying track 57 upstream of the first buffer storage device 21 by a switchable routing device 58 to the first buffer storage device 21. The routing device 58 is adjusted to the first buffer storage device 21. It is connected upstream—as observed in the conveying direction of the objects—to the first buffer storage device 21 and the second buffer storage device 22 and guides the objects to one or the other of the storage devices.

As FIG. 1 shows a switchable second routing device 59 can be provided, which is connected downstream in the conveying direction of the objects to the first buffer storage device 21 and the second buffer storage device 22. This second routing device 59 acts to guide the objects out from the storage devices. Both routing devices 58 and 59 can be similarly structured.

Figure 4:
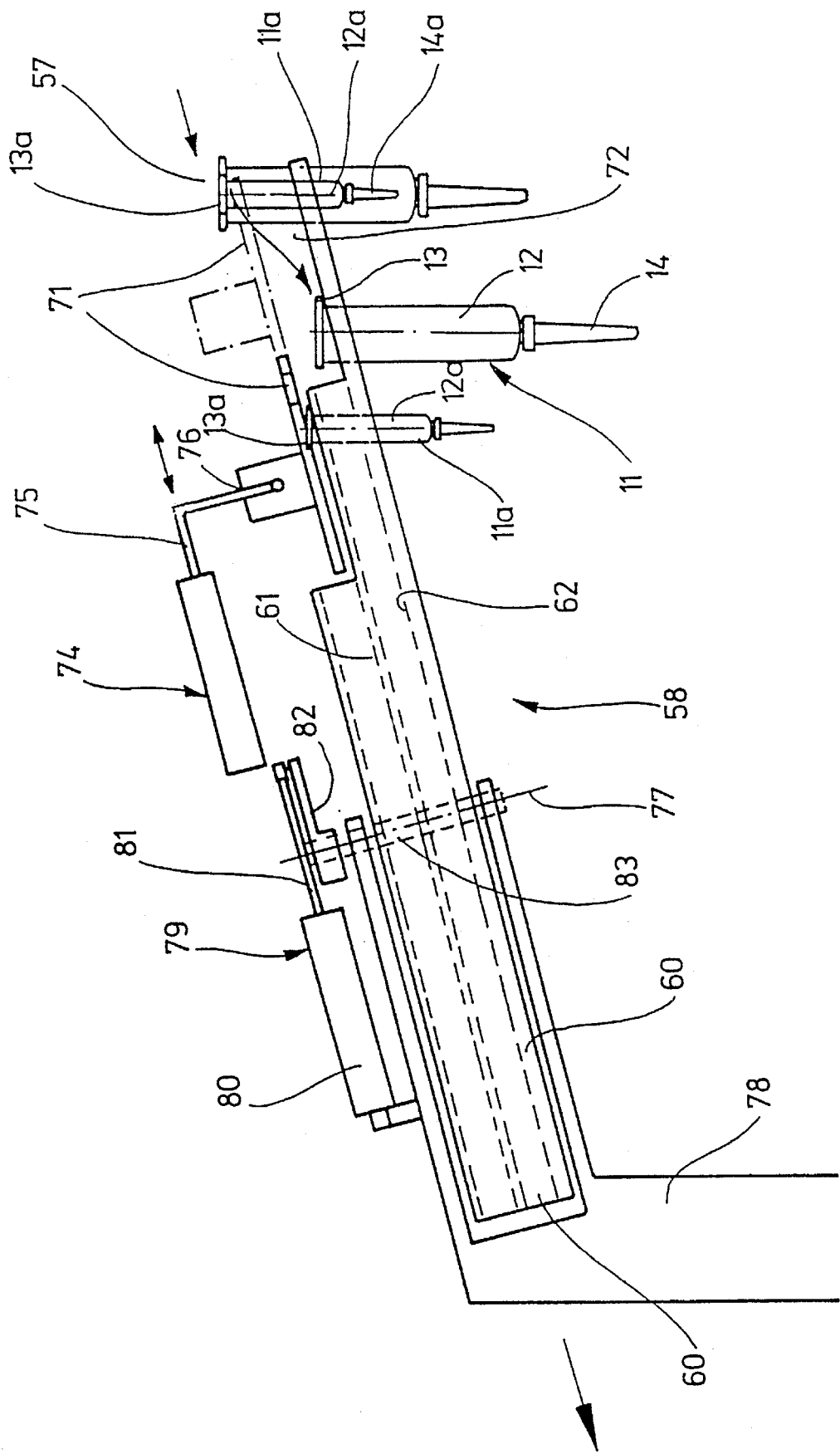
FIG. 4 is a schematic side view of the object routing mechanisms.

Individual features of the first routing device 58 are illustrated and explained with the help of FIGS. 3 and 4. The routing device 58 has a one-piece guide member 60, which is switchable or shiftable. At least three different dimensioned types of objects 11, 11a and/or 11b are feedable or conveyable to the first upper guideway 51 or to the second lower guideway 52 of the first buffer storage device 21 or instead to the guideway of the second buffer storage device 22. In the case of the second routing device 59 the objects are conveyable from the storage devices with it.

The guide member 60 contains a first upper guide slot 61 and second lower guide slot 62 located directly under it correlated with the first buffer storage device 21. The first guide slot 61 corresponds in its cross-section to the first upper guideway 51 and the second guide slot 62 corresponds in its cross-section to the second lower guideway 52 of the first buffer storage device 21 and are dimensioned accordingly.

A third guide slot 63 which is formed T-shaped like the first and second guide slots 61 and 62 is provided in the guide member 60 spaced from both guide slots 61, 62 arranged above each other. The guide slot 63 is associated with the groove 56 in the second buffer storage device 22 and is fit to its cross-section.

An aligned first feed section 71 for feeding the objects 11a is provided in the guide member 60 associated with the first guide slot 61. Also an aligned second feed section 72 for feeding the objects 11 is provided in the guide member 60 associated with the second guide slot 62. In a similar way an aligned third feed section 73 is provided for feeding the objects 11b to the third guide slot 63.

The outlet of the first upper guide slot 61 in the guide member 60 is approximately at the height of the entrance of the first upper guideway 51. The outlet of the second guide slot 62 is approximately at the height of entrance of the second guideway 52. This results when the guide member 60 takes the position shown in FIG. 3 in which the guide member 60 is aligned with the first buffer storage device 21 and its guideways 51, 52.

As is apparent from the drawing, the first feed section 71 which is associated with the first guide slot 61, extends above the second feed section 72, which is associated with the second lower guide slot 62. Both feed sections 71 and 72 extend, as is particularly shown in FIG. 4, beyond the outlet of the guideway 57, which is upstream of the routing device 58, so that the objects 11, 11a, which leave the guideway 57, drop at least slightly to fall on the second feed section 72 or the first feed section 71 brought into position or the third feed section 73 brought into a receiving position.

The first feed section 71, which cooperates with upper guide slot 61, is shiftable between a retracted position shown in FIG. 4 with solid lines and an advanced position shown with dashed lines in FIG. 4 in relation to the outlet of the guideway 57. In the first named retracted position, which is shown with solid lines, the first feed section 71 is inactive. The objects 11 leaving the outlet of the guideway 57 are thus conducted to the second feed section 72, which cooperates with the second guide slot 62 in the guide member 60. The first feed section 71 shown with dashed lines in FIG. 4 overlaps the second feed section 72 under it so that the objects 11a are conducted from the outlet of the guideway 57 to the first feed section 71 and from it to the associated first guide slot 61 in the guide member 60.

To move the first feed section 71 between the two described shift positions a feed section drive 74 connected to the first feed section 71 is engaged which for example can be pressurized medium operated drive cylinder whose piston rod 75 acts via a transmission element on the first feed section 71 coupled to it in the shift direction.

The third guide slot 63 in the guide member 60 is fit to the form and size of the guideway 56 in the second buffer storage device 22.

As is apparent from FIG. 3, each feed section 71, 72 and 73 is provided with a longitudinally extending opening for the transport of the respective objects 11a and/or 11b and/or 11 and bearing surfaces running along the edges of these slots on which the respective flanges 13a and/or 13b and/or 13 contact. Each feed section 71 to 73 are aligned with the correlated slots 61 to 63, in which continue or pass over into the feed sections.

As detectable particularly from FIG. 4, each feed section 71, 72 and 73 and each following slots 61 and/or 62 and/or 63 of the guide member 60 drops steeply downward from the entrance located on the right in FIG. 4 of the respective feed section 71, 72 and 73 to the outlet found on the left in FIG. 4 of the respective slots 61 and/or 62 and/or 63. The steep path assists in the forward conveyance of the objects.

The guide member 60 is pivotable about a pivot axis 77 inclined to the vertical between a first pivot position inclined in FIG. 3 and a second pivot position. In the shown first position the guide member 60 is set up to connect the guideway 57 and the first buffer storage device 21. In the second unshown position the guide member 60 is set so as to connect the guideway 57 to the second buffer storage device 22.

A holder 78 is provided for holding a supporting the guide member 60. The guide member 60 is pivotally mounted in the holder 78 about the pivot axis 77. A guide member positioning drive 79 is connected to the guide member 60 for pivoting it about the pivot axis 77. The guide member positioning drive 79 comprises a pressurized medium-operated working cylinder whose cylinder housing 80 is rigidly connected to the holder 78 and those extendible piston rod 81, e.g. acts on a pivotally connected pivot arm 82, which is, in turn, connected rigidly with a guide member shaft 83 at one of its ends, which, for its part, is rigidly secured to the guide member 60 so that, when the pivot arm 82 is operated by the piston-cylinder arrangement, a pivoting of the guide member 60 occurs via rotation of the shaft 83 rigidly connected to it.

The guide member 60 is aligned with the first buffer storage device 21 in the position shown in FIG. 3. The first feed section 71 is located in its inactive position so that the objects delivered from the guideway 57 reach the second feed section 72 and from it to the second slot 62 and from that into the second guideway 52 of the first buffer storage device 21.

If the conveying apparatus 10 is shifted to transport objects 11a of different cross-section, e.g. smaller cross-section, the first feed section 71 is activated so that the piston rod 75 in FIG. 3 is shifted upwardly to the right by the drive 74 and the first feed section 71 is thus advanced so that it overlaps the second feed section 72 at the entrance or inlet as is shown with dashed lines in FIG. 4. In this position the smaller objects 11a delivered from the guideway 57 drop to the first feed section 71, from which they reach the first slot 61 and from it the first groove 51 of the first buffer storage device 21.

If the conveying apparatus 10 is adjusted to objects of different diameter, e.g. objects 11b, the guide member 60 is pivoted about the pivot axis 77 by means of the guide member positioning device 79 so that the feed section 73 reaches the vicinity of the outlet of the guideway 57 and the outlet of the slot 63 is at the level of the inlet or entrance of the guideway 56 in the second buffer storage device 22 so that the objects 11b are received from the feed section 73 and are fed to the slot 63 and from it are conducted into the guideway 56 of the second buffer storage device 22.

The routing device 58 thus allows the conveying apparatus 10 to be adjusted rapidly and economically to three different sizes of objects 11 and/or 11a and/or 11b.

The conveying tracks, e.g., 18 and 19, each have longitudinally extending conveyor elements 44 and 45 along opposite sides, which form a track slot 46 between them for receiving and conveying the objects 11. The conveyor elements 44, 45, at least the sections bounding the track slot 46, have facing flat surfaces and are arranged inclined with respect to each other so that the track slot 46 has a wedge-like shape, i.e. is tapered from top to bottom in such a way that the objects 11 are drawn under the influence of gravity into the wedge-like track slot 46 with tolerance compensation and increased static friction. To fit the conveyor apparatus 10 to the objects 11, 11a, 11b of different diameters both conveyor elements 44 and 45 are movable to and from each other to adjust the spacing of the track slot 46. Under certain circumstances the adjustment of the conveyor elements relative to each other is sufficient. Instead of this however in other circumstances no adjustment is necessary because the wedge-like track slot 46 can accommodate different size objects.

While the invention has been illustrated and embodied in a conveying apparatus for elongated objects, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

What is claimed is:

1. Conveying apparatus for transporting a plurality of elongated objects, each of said objects having a radially protruding flange, said conveying apparatus comprising means for conveying said objects (11, 11a, 11b) in a conveying direction including two conveying tracks (18, 19) over which said objects (11) are movable in a suspended position on bearing surfaces of the conveying tracks with said flanges (13) contacting said bearing surfaces;

at least one vertical buffer storage device (21, 22) each comprising a vibrating conveyor having at least one substantially spiral guideway (51, 52, 56) for conveying said objects substantially vertically downward; and/or at least one adjustable connecting guide device (20), one of said at least one connecting guide devices (20) being arranged between opposing ends of the two conveying tracks (18, 19) and including means for conveying said objects (11, 11a, 11b) around a curved path between the two conveying tracks (18, 19).

2. Conveying apparatus as defined in claim 1, wherein said connecting guide device (20) between said conveying tracks (18, 19) has at least one guide support (23) provided with a plurality of guide tracks (24 to 27) and means for selecting one of said guide tracks (24 to 27) for conveying said objects (11, 11a, 11b) between said two conveying tracks (18, 19).

3. Conveying apparatus as defined in claim 2, wherein each of said guide tracks (24 to 27) is dimensioned to convey a different sized one of said objects (11, 11a, 11b).

4. Conveying apparatus as defined in claim 2, wherein each of said guide tracks (24 to 27) has a different width to accommodate different sized ones of said objects.

5. Conveying apparatus as defined in claim 2, wherein said means for selecting one of said guide tracks (24 to 27) includes means for displacing said at least one guide support (23).

6. Conveying apparatus as defined in claim 2, wherein said means for selecting one of said guide tracks (24 to 27) includes means for rotating said at least one guide support (23).

7. Conveying apparatus as defined in claim 6, wherein said means for rotating rotates said at least one guide support (23) about a substantially vertical rotation axis to each of a plurality of active positions, each of said active positions connecting said two conveying tracks (18, 19) with a selected one of said guide tracks (24 to 27) according to said active position selected by said means for rotating.

8. Conveying apparatus as defined in claim 7, wherein said at least one guide support (23) is indexable in each of said active positions.

9. Conveying apparatus as defined in claim 7, wherein said means for rotating includes a positioning mechanism (29) acting on said at least one guide support (23) for rotation of said at least one guide support (23).

10. Conveying apparatus as defined in claim 9, wherein said positioning mechanism (29) comprises a positioning motor.

11. Conveying apparatus as defined in claim 10, wherein said positioning motor is a stepping motor.

12. Conveying apparatus as defined in claim 9, wherein said positioning mechanism (29) comprises a handle (30) for manually selecting said active position and a locking device for locking said at least one guide support (23) in said active position selected with said handle (30).

13. Conveying apparatus as defined in claim 2, wherein at least two of said guide tracks (24 to 27) of said at least one guide support (23) include means for conveying said objects (11) on said curved path around a 90° angle and said at least one guide support (23) is rotatable around said 90° angle.

14. Conveying apparatus as defined in claim 2, wherein said at least one guide support (23) has n of said guide tracks and each of said guide tracks includes means for conveying said objects on said curved path around a $360/n_1$ degree angle and said at least one guide support (23) is rotatable around said $360/n_1$ degree angle.

15. Conveying apparatus as defined in claim 2, wherein said at least one guide support (23) has an approximately star-shaped form.

16. Conveying apparatus as defined in claim 2, wherein each of said guide tracks (24 to 27) of said at least one guide support (23) has means (39 to 41) for suspending said objects (11) by said flanges (13) of said objects (11).

17. Conveying apparatus as defined in claim 2, wherein each of said guide tracks (24 to 27) of said at least one guide support (23) is provided with a longitudinal slot (38, 39), said objects (11) extending through said longitudinal slot (38, 39).

18. Conveying apparatus as defined in claim 2, wherein each of said longitudinal slots (38, 39) has a different width.

19. Conveying apparatus as defined in claim 2, wherein each of said guide tracks (24 to 27) of said at least one guide support (23) is provided with a track entrance (42) and a track outlet (43) and runs steeply down from said track entrance to said track outlet.

20. Conveying apparatus as defined in claim 2, wherein each of said guide tracks (24 to 27) of said at least one guide support (23) has means (39 to 41) for suspending said objects (11) by said flanges (13) of said objects (11) and each of said longitudinal slots has a different width in the vicinity of said means for suspending.

21. Conveying apparatus as defined in claim 2, wherein said at least one guide support (23) is made from plastic material.

22. Conveying apparatus as defined in claim 1, wherein said at least one spiral guideway (51, 52, 56) of said at least one vertical buffer storage device (21, 22) is formed as an approximately T-shaped cross-sectioned spiral groove having an arm and a stem, said flanges (13) of said objects (11) fit in said arm of said spiral groove and parts of said objects (11) other than said flanges (13) fit in said stem of said spiral groove.

23. Conveying apparatus as defined in claim 22, wherein each of said at least one spiral guideways (51, 52, 56) has means for holding and guiding said objects (11) at an acute angle to a vertical direction.

24. Conveying apparatus as defined in claim 23, wherein said acute angle is not greater than 45°.

25. Conveying apparatus as defined in claim 1, wherein one of said at least one vertical buffer storage device (21, 22) has a first (51) of said at least one spiral guideways and an associated second (52) of said at least one spiral guideways located below said first spiral guideway (51) and said first and said second spiral guideways (51, 52) have means for conveying said objects downward vertically and have different transverse cross-sections.

26. Conveying apparatus as defined in claim 25, wherein said first spiral guideway (51) consists of a first T-shaped spiral groove having an arm and a stem and said second spiral guideway (52) consists of second T-shaped spiral groove including an arm and a stem, said stem of said first T-shaped spiral groove being connected to said arm of said second T-shaped spiral groove, and said transverse cross-section of said first spiral guideway (51) is smaller than said transverse cross-section of said second spiral guideway (52) so that said objects (11) conveyed by said second spiral guideway (52) are larger than said objects (11a) conveyed by said first spiral guideway (51).

27. Conveying apparatus as defined in claim 26, wherein said at least one vertical buffer storage device (21, 22) consists of a first buffer storage device (21) and a second buffer storage device (22) spaced from said first buffer storage device (21).

28. Conveying apparatus as defined in claim 27, wherein said first buffer storage device (21) and a second buffer storage device (22) are substantially equal.

29. Conveying apparatus as defined in claim 27, wherein said first buffer storage device (21) includes said first spiral guideway (51) and said second spiral guideway (52) and said second buffer storage device (22) has a third (56) of said at least one substantially spiral guideways, and said objects (11b) conveyed in said third spiral guideway (56) of said second buffer storage device (22) are larger than said objects (11) conveyed in said second spiral guideway (52).

30. Conveying apparatus as defined in claim 29, further comprising a switchable first routing device (58) located upstream of said first buffer storage device (21) and said second buffer storage device (22) and including means for feeding said objects (11) to said storage devices (21, 22).

31. Conveying apparatus as defined in claim 30, further comprising a switchable second routing device (59) located downstream of said first buffer storage device (21) and said second buffer storage device (22) and including means for receiving said objects from said storage devices (21, 22).

32. Conveying apparatus as defined in claim 31, wherein said switchable first routing device (58) and said switchable second routing device (59) are substantially equal.

33. Conveying apparatus as defined in claim 31, wherein each of said switchable first routing device (58) and said switchable second routing device (59) comprises a guide member (60) for said objects (11, 11a, 11b) of at least three different sizes received from said second spiral guideway (52) of said first buffer storage device (21) and from said third spiral guideway (56) of said second buffer storage device (22) and delivered therefrom.

34. Conveying apparatus as defined in claim 33, wherein said guide member (60) is provided with a first upper guide slot (61) connectable with the first upper spiral guideway (51) and a second lower guide slot (62) connectable with the second lower spiral guideway (52) and a first feed section (71) aligned with said first upper guide slot (61) and a second feed section (72) aligned with said second lower guide slot (62), and a guide slot outlet of the first upper guide slot (61) is approximately at a level of a guideway entrance of the first upper spiral guideway (51) and a guide slot outlet of the second guide slot (62) is approximately at a level of a guideway entrance of the second guideway (52) when said guide member (60) is aligned with said first buffer storage device (21).

35. Conveying apparatus as defined in claim 34, wherein said first upper guide slot (61) connectable with the first upper spiral guideway (51) extends above said second lower guide slot (62) connectable with the second spiral guideway (52).

36. Conveying apparatus as defined in claim 35, wherein both of said first and second feed sections (71, 72) extend beyond a track outlet of an upstream one of said conveying tracks (57).

37. Conveying apparatus as defined in claim 36, further comprising means for sliding said first feed section (71) between a retracted position and an advanced position relative to said conveying direction, and wherein said first feed section (71) is inactive in said retracted position so that said objects (11) from said track outlet of said upstream conveying track (57) are guided to said second feed section (72) associated with said second lower guide slot (62) and said first feed section (71) overlaps said second feed section (72) in said advanced position and receives said objects from said track outlet of said upstream conveying track (57) and feeds said objects (11a) to said first upper guide slot (61).

38. Conveying apparatus as defined in claim 37, wherein said means for sliding said first feed section (71) comprises a feed section drive (74).

39. Conveying apparatus as defined in claim 38, wherein said feed section drive (74) comprises a pressurized medium operated cylinder device.

40. Conveying apparatus as defined in claim 39, wherein said guide member (60) has a third approximately T-shaped guide slot (63) with an upstream third feed section (73) spaced beside both of said lower guide slot (62) and said upper guide slot (61) and associated feed sections (71, 72).

41. Conveying apparatus as defined in claim 40, wherein said third guide slot (63) has a transverse cross-section corresponding to a transverse cross-section of said third spiral guideway (56) of said second buffer storage device (22).

42. Conveying apparatus as defined in claim 41, wherein each of said feed sections is provided with a longitudinally extending opening through which said objects extend when said objects are conveyed.

43. Conveying apparatus as defined in claim 42, wherein each of said feed sections (71, 72, 73) has an inlet opening and each of said guide slots (61, 62, 63) associated with said feed section has an outlet opening and said inlet opening is associated with said outlet opening so that objects travel through said guide slots and then said feed sections and are conveyed steeply downward.

44. Conveying apparatus as defined in claim 43, wherein said guide member (60) is pivotable about a pivot axis (77)

between a first pivot position in which said guide member (60) is connectable to said first buffer storage device (21) for transfer of said objects and a second pivot position in which said guide member (60) is connectable to said second buffer storage device (22) for transfer of said objects, said pivot axis (77) being inclined to a vertical direction.

45. Conveying apparatus as defined in claim 44, wherein said guide member (60) is pivotally mounted on a holder (78) to be pivotally mounted about said pivot axis (77).

46. Conveying apparatus as defined in claim 44, wherein said guide member (60) is provided with a guide member positioning drive (79) for pivoting said guide member (60) between a first guide member pivot position and a second guide member pivot position.

47. Conveying apparatus as defined in claim 46, wherein said guide member positioning drive (79) comprises a pressurized medium operated cylinder.

48. Conveyor apparatus as defined in claim 1, wherein each of said conveying tracks (18, 19) includes two longitudinally extending conveyor elements (44, 45) on each side thereof and has a longitudinally extending track slot (46) between said conveyor elements (44, 45) to receive and to convey said objects.

49. Conveyor apparatus as defined in claim 48, wherein at least adjacent sections of said conveyor elements (44, 45) bordering said track slot (46) have a flat surface and are inclined relative to each other so that said track slot (46) has a wedge shape so that said objects (11, 11a, 11b) are suspended on said conveying tracks (18, 19) by gravity in said track slot (46) having said wedge shape for compensation of tolerances of said objects (11, 11a, 11b) and for increase static friction.

\* \* \* \* \*